(12) United States Patent
Smith et al.

(10) Patent No.: US 8,311,032 B2
(45) Date of Patent: Nov. 13, 2012

(54) DYNAMICALLY PROVISIONING VIRTUAL MACHINES

(75) Inventors: Bruce A. Smith, Austin, TX (US); Edward S. Suffern, Chapel Hill, NC (US); James L. Wooldridge, Fall City, WA (US)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 12/630,626

(22) Filed: Dec. 3, 2009

(65) Prior Publication Data

US 2011/0134761 A1    Jun. 9, 2011

(51) Int. Cl.
*H04L 12/28* (2006.01)
(52) U.S. Cl. .................................................. 370/351
(58) Field of Classification Search .................. 370/351, 370/357, 360, 389, 395.52, 400; 709/1, 220–229; 718/100–105
See application file for complete search history.

(56) References Cited

U.S. PATENT DOCUMENTS

| | | | |
|---|---|---|---|
| 7,127,716 B2 | 10/2006 | Jin et al. | |
| 7,162,711 B2 | 1/2007 | Czajkowski et al. | |
| 7,165,108 B2 | 1/2007 | Matena et al. | |
| 7,213,065 B2 | 5/2007 | Watt | |
| 7,257,811 B2 | 8/2007 | Hunt et al. | |
| 7,395,388 B2 | 7/2008 | Sugiura et al. | |
| 7,437,730 B2 | 10/2008 | Goyal | |
| 7,716,377 B2 | 5/2010 | Harris et al. | |
| 8,051,166 B1 * | 11/2011 | Baumback et al. | 709/224 |
| 2003/0217166 A1 | 11/2003 | Canto et al. | |
| 2007/0130566 A1 | 6/2007 | van Rietschote et al. | |
| 2007/0288921 A1 | 12/2007 | King et al. | |
| 2008/0091761 A1 | 4/2008 | Tsao | |
| 2008/0196043 A1 | 8/2008 | Feinleib et al. | |
| 2008/0307183 A1 | 12/2008 | DeVal et al. | |
| 2009/0106409 A1 | 4/2009 | Murata | |
| 2009/0150529 A1 | 6/2009 | Tripathi | |

(Continued)

FOREIGN PATENT DOCUMENTS

JP    3065734 A    3/1991

(Continued)

OTHER PUBLICATIONS

Zhao-et al.; "Experimental Study of Virtual Machine Migration in Support of Reservation of Cluster Resources"; ACM Digital Library; pp. 1-8; 2007.

(Continued)

*Primary Examiner* — Dmitry H Levitan
(74) *Attorney, Agent, or Firm* — Cynthia G. Seal; Jeffrey L. Streets (57) ABSTRACT

Method and computer program for managing the network response times experienced by virtual machines. Traffic is routed within an Ethernet network through a network switch according to IP addresses identified within Ethernet frames. A plurality of compute nodes are each coupled to the network switch via a separate Ethernet link. A response time is determined for each virtual machine running on the compute nodes, wherein the response time for a particular virtual machine is the difference between a time stamp in a TCP/IP Request message and a time stamp in a TCP/IP Response message for an IP address assigned to the particular virtual machine. The particular virtual machine may then be migrated to a target compute node in response to a particular one of the virtual machines on a particular one of the compute nodes having a response time that exceeds a response time setpoint.

23 Claims, 6 Drawing Sheets

U.S. PATENT DOCUMENTS

| | | | |
|---|---|---|---|
| 2009/0228589 A1 | 9/2009 | Korupolu | |
| 2010/0131649 A1* | 5/2010 | Ferris | 709/226 |
| 2010/0138829 A1 | 6/2010 | Hanquez et al. | |
| 2010/0223364 A1* | 9/2010 | Wei | 709/220 |
| 2010/0223397 A1* | 9/2010 | Elzur | 709/235 |
| 2010/0322255 A1* | 12/2010 | Hao et al. | 370/398 |
| 2011/0078303 A1* | 3/2011 | Li et al. | 709/224 |
| 2011/0138384 A1* | 6/2011 | Bozek et al. | 718/1 |

FOREIGN PATENT DOCUMENTS

| | | |
|---|---|---|
| JP | 4355836 A | 12/1992 |

OTHER PUBLICATIONS

Urgaonkar-et al.; "Agile Dynamic Provisioning of Multi-Tier Internet Applications"; ACM Digital Library; pp. 1-39; 2008.

Shivam-et al.; "Automated an On-Demand Provisioning of Virtual Machines for Database Applications"; ACM Digital Library; pp. 1079-1081; 2007.

IBM- "Automatic Virtual Machine Provisioning"; IPCOM000128928D; 4 pages, Sep. 21, 2005.

Sundararaj-et al.; "Automatic, run-time and dynamic adaptation of distributed applications executing in virtual environments"; DIA-LOG-Dissertation Absts., V67-10B; 2006, One page.

Jian Wang, "Survey of State-of-the-art in Inter-VM Communication Mechanisms", Sep. 27, 2009, pp. 1-25.

Chang-et al.; "Virtual machine support for zero-loss Internet service recovery"; INSPEC/Software: Practice & Experience, vol. 37, No. 13, pp. 1349-1376; Nov. 2007.

Cisco, "Cisco Nexus 1000V Network Analysis Module Virtual Service Blade", Data Sheet, 2010, pp. 1-7.

* cited by examiner

Compute Node 0

| VM ID | IP Address | TCP/IP Request time stamp | TCP/IP Response time stamp | Response time ΔT in milliseconds |
|---|---|---|---|---|
| Company A web server 1 | 192.168.70.1 | 09:22:43:223 | 09:22:43:243 | 20 |
| | | 09:22:43:229 | 09:22:43:248 | 17 |
| | | 09:22:43:244 | 09:22:43:263 | 19 |
| Company A web server 2 | 192.168.70.2 | 09:22:43:244 | 09:22:43:255 | 11 |
| | | 09:22:43:245 | 09:22:43:262 | 17 |
| | | 09:22:43:245 | 09:22:43:270 | 25 |
| | | 09:22:43:246 | 09:22:43:293 | 47 * |
| | | 09:22:43:248 | 09:22:43:300 | 52 * |
| Company A web server 3 | 192.168.70.3 | 09:22:43:208 | 09:22:43:228 | 20 |
| | | 09:22:43:219 | 09:22:43:237 | 18 |
| | | 09:22:43:240 | 09:22:43:253 | 13 |
| | | 09:22:43:251 | 09:22:43:272 | 21 |
| | | 09:22:43:272 | 09:22:43:289 | 17 |
| ... | ... | | | |
| Company A web server n | 192.168.70.n | | | |
| Company A web server 0 avg | | | | 35 * |

*— response time exceeding the response time setpoint of 30 milliseconds.

Compute Node 1

| VM ID | IP Address | TCP/IP Request time stamp | TCP/IP Response time stamp | Response time ΔT in milliseconds |
|---|---|---|---|---|
| Company A web server 11 | 192.168.71.1 | 09:22:43:223 | 09:22:43:224 | 1 |
| | | 09:22:43:229 | 09:22:43:235 | 6 |
| | | 09:22:43:244 | 09:22:43:253 | 9 |
| Company A web server 12 | 192.168.71.2 | 09:22:43:254 | 09:22:43:257 | 3 |
| | | 09:22:43:256 | 09:22:43:259 | 3 |
| | | 09:22:43:262 | 09:22:43:270 | 8 |
| | | 09:22:43:269 | 09:22:43:272 | 3 |
| | | 09:22:43:295 | 09:22:43:300 | 5 |
| Company A web server 13 | 192.168.71.3 | 09:22:43:216 | 09:22:43:219 | 3 |
| | | 09:22:43:219 | 09:22:43:222 | 3 |
| | | 09:22:43:229 | 09:22:43:233 | 4 |
| | | 09:22:43:267 | 09:22:43:272 | 5 |
| | | 09:22:43:288 | 09:22:43:291 | 3 |
| ... | ... | | | |
| Company A web server 1n | 192.168.71.n | | | |
| Company A web server 1 avg | | | | 9 |

FIG. 3A

Compute Node 2 — 48B, 46B

| VM ID | IP Address | TCP/IP Request time stamp | TCP/IP Response time stamp | Response time ΔT in milliseconds |
|---|---|---|---|---|
| Company A web server 21 | 192.168.72.1 | 09:22:43:223 | 09:22:43:230 | 7 |
| | | 09:22:43:229 | 09:22:43:240 | 11 |
| | | 09:22:43:244 | 09:22:43:253 | 9 |
| Company A web server 22 | 192.168.72.2 | 09:22:43:254 | 09:22:43:257 | 3 |
| | | 09:22:43:256 | 09:22:43:259 | 3 |
| | | 09:22:43:262 | 09:22:43:270 | 8 |
| | | 09:22:43:269 | 09:22:43:272 | 3 |
| | | 09:22:43:295 | 09:22:43:300 | 5 |
| Company A web server 23 | 192.168.72.3 | 09:22:43:216 | 09:22:43:219 | 3 |
| | | 09:22:43:219 | 09:22:43:222 | 3 |
| | | 09:22:43:229 | 09:22:43:233 | 4 |
| | | 09:22:43:267 | 09:22:43:272 | 5 |
| | | 09:22:43:288 | 09:22:43:291 | 3 |
| ... | ... | | | |
| Company A web server 2n | 192.168.72.n | | | |
| Company A web server 2 avg | | | | 9 |

Compute Node 3 — 50B

| VM ID | IP Address | TCP/IP Request time stamp | TCP/IP Response time stamp | Response time ΔT in milliseconds |
|---|---|---|---|---|
| Company A web server 31 | 192.168.73.1 | 09:22:43:223 | 09:22:43:224 | 1 |
| | | 09:22:43:237 | 09:22:43:240 | 3 |
| | | 09:22:43:249 | 09:22:43:251 | 2 |
| Company A web server 32 | 192.168.73.2 | 09:22:43:254 | 09:22:43:257 | 3 |
| | | 09:22:43:256 | 09:22:43:259 | 3 |
| | | 09:22:43:269 | 09:22:43:270 | 1 |
| | | 09:22:43:269 | 09:22:43:272 | 3 |
| | | 09:22:43:298 | 09:22:43:300 | 2 |
| Company A web server 33 | 192.168.73.3 | 09:22:43:216 | 09:22:43:219 | 3 |
| | | 09:22:43:219 | 09:22:43:222 | 3 |
| | | 09:22:43:229 | 09:22:43:233 | 4 |
| | | 09:22:43:267 | 09:22:43:272 | 5 |
| | | 09:22:43:288 | 09:22:43:291 | 3 |
| ... | ... | | | |
| Company A web server 3n | 192.168.73.n | | | |
| Company A web server 3 avg | | | | 3 |

DYNAMICALLY PROVISIONING VIRTUAL MACHINES

BACKGROUND

1. Field of the Invention

The present invention relates to the management of virtual machines. More specifically, the present invention relates to managing system resources available to a virtual machine.

2. Background of the Related Art

In a cloud computing environment, a user is assigned a virtual machine somewhere in the computing cloud. The virtual machine provides the software operating system and physical resources, such as processing power and memory, to support the user's application. Provisioning software assigns virtual machines based on the amount of storage required to store the application and the amount of storage to execute the applications.

Figure 1:
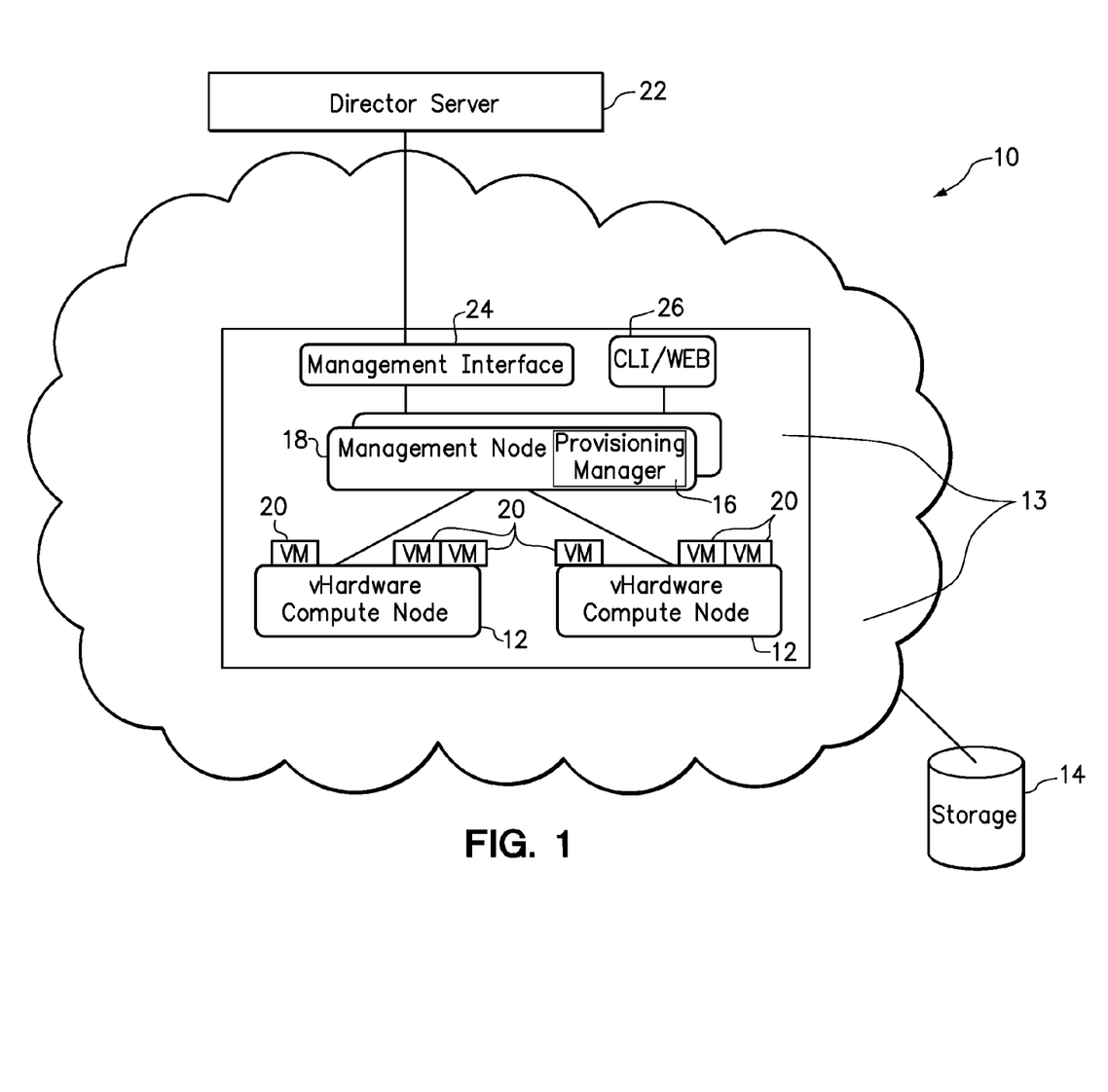
FIG. 1 is a schematic diagram of a group of servers or compute nodes in a "cloud" environment as a pool of resources for users.

FIG. 1 is a schematic diagram of a system 10 including a group of servers or other compute nodes 12 in a "cloud" environment as a pool of resources for users. The compute nodes 12 within the cloud are in communication over the network 13 with a boot storage device 14 that provides the guest operating systems and applications for the users. The provisioning manager software 16 resides in the management node 18 and allocates boot storage within the storage device 14 to contain the maximum number of guest operating systems and associate applications based on the total amount of storage within the cloud. For example, if each guest operating system and its associated applications require 1 GByte of storage and the additional memory space needed to execute those applications is 1 GByte, then each virtual machine 20 requires 2 GBytes of memory storage. If the total amount of memory storage within a physical compute node 12 is 64 GB, then the provisioning software 16 assumes that each physical compute node 12 can support 32 virtual machines 20. It is assumed that the processor within the physical compute node 12 is able to execute multiple virtual machines 20 concurrently.

The Director Server 22 within the cloud structure is the entity that manages and allocates the operating system, licenses, and associated applications to all virtual machines 20 within the compute nodes of the cloud structure. The Director Sever 22 obtains the physical attributes of all the compute nodes 12 within the cloud structure and provisions the operating systems and applications within the storage device 14. The management interface 24, which is typically an Ethernet interface, provides the physical interface between the cloud and the Director Server 22. A command line interface or web interface (CLI/WEB) 26 allows administrators to monitor the configuration and dynamically change it depending on network conditions. Within the network cloud, network switches connect the vHardware compute nodes 12 to each other and to the management node 18 and the associated provisioning manager 16. The Director Server controls the overall provisioning of operating systems, licenses and associated application by communicating with the management node 18 and provisioning manager 16. In actual practice, the management node 18 and provisioning manager 16 reside in an industry rack full of compute nodes while the Director Server controls multiple racks of management nodes 18, provisioning mangers 16 and computer nodes 12.

BRIEF SUMMARY

One embodiment of the present invention provides a method, and a computer program product for performing the method, comprising routing traffic within an Ethernet network through a network switch according to IP addresses identified within Ethernet frames, wherein the Ethernet network includes a plurality of compute nodes, and each compute node is coupled to the network switch via a separate Ethernet link. The method also comprises determining a response time for each of a plurality of virtual machines running on the plurality of compute nodes, wherein the response time for a particular one of the virtual machines is calculated as the difference between a time stamp in a TCP/IP Request message and a time stamp in a TCP/IP Response message for an IP address (media access control address) assigned to the particular one of the virtual machines. The method further comprises migrating a virtual machine in response to a particular one of the virtual machines on a particular one of the compute nodes having a response time that exceeds a response time setpoint, wherein the particular virtual machine is migrated from the particular compute node to a target one of the compute nodes that is determined to be currently providing a lower response time than the specified compute node.

Another embodiment of the present invention provides a method, and a computer program product for performing the method, comprising routing traffic within an Ethernet network through a network switch according to IP addresses identified within Ethernet frames, wherein the Ethernet network includes a plurality of compute nodes, and each compute node is coupled to the network switch via a separate Ethernet link. The method also comprises determining a response time for each of a plurality of virtual machines running on the plurality of compute nodes, wherein the response time for a particular one of the virtual machines is calculated as the difference between a time stamp in a TCP/IP Request message and a time stamp in a TCP/IP Response message for an IP address (media access control address) assigned to the particular one of the virtual machines. Still further, the method comprises provisioning an additional virtual machine to a particular one of the compute nodes, wherein the particular compute node is determined as providing the lowest response time to the virtual machines running on the particular compute node.

DETAILED DESCRIPTION

One embodiment of the present invention provides a method, and a computer program product for performing the method, comprising routing traffic within an Ethernet network through a network switch according to IP addresses identified within Ethernet frames, wherein the Ethernet network includes a plurality of compute nodes, and each compute node is coupled to the network switch via a separate Ethernet link. The method also comprises determining a response time for each of a plurality of virtual machines running on the plurality of compute nodes, wherein the response time for a particular one of the virtual machines is calculated as the difference between a time stamp in a TCP/IP Request message and a time stamp in a corresponding TCP/IP Response message for an IP address (media access control address) assigned to the particular one of the virtual machines. The method further comprises migrating a virtual machine in response to a particular one of the virtual machines on a particular one of the compute nodes having a response time that exceeds a response time setpoint, wherein the particular virtual machine is migrated from the particular compute node to a target one of the compute nodes that is determined to be currently providing a lower response time than the specified compute node.

The method is preferably executed by a provisioning manager module running on a management node. The provisioning manager is thus responsible for provisioning the virtual machines within the compute node and then managing them. In the context of an Ethernet network, the provisioning manager is in communication with a network switch, or high speed switch module (HSSM), which includes a management information database, or management information base (MIB). Accordingly, the provisioning manager may obtain or read network statistics from the management information base, such as the response time through each Ethernet link and the response time for the Internet Protocol (IP) address associated with each VM within the compute node. Access to this information enables the provisioning manager to determine whether an Ethernet link to a given compute node has reached its link capacity, such that the virtual machines running on the compute node, as identified by a unique IP address assigned to each virtual machine, may be experiencing increased latency or response times.

Response time may be critical to users running certain applications. In a virtual machine environment, where a number of users have access to the same physical resources, processing power is limited. This limited amount of processing power can lead to long response times due to different application resource requirements. When response time increases to an unacceptable level, the virtual machine may be migrated to a target compute node in the network. Optionally, the target compute node may be selected as one of the compute nodes in the network that is currently providing a lower response time than the response time the particular virtual machine is experiencing on the particular compute node.

In another embodiment, the method further comprises identifying the TCP/IP Response message as having the next sequence number following a sequence number in the TCP/IP Request message for the IP address. Accordingly, this embodiment utilizes the standard method of sequence numbers in the Ethernet TCP/IP protocol to determine the response times to user requests. The TCP/IP Request message uses a sequence number (SEQ_NUM) for message correlation. The TCP/IP Response message uses the next sequence number (SEQ_NUM+1) in the response. The difference between the time stamp when the message is sent and the time stamp when the message is received is the response time. Each IP address (and therefore each virtual machine in a compute node) has it own set of sequence numbers.

Based on a preset limit or response time setpoint, a virtual machine experiencing excessive response time can be identified. For example, if the response time exceeds the response time setpoint, a message may be sent to the provisioning manager. The provisioning manager is then able to determine whether or not to move the virtual machine to a less heavily loaded physical compute node, identify a target compute node for receiving the virtual machine, and then migrate the virtual machine to the target computer node. Accordingly, the virtual machine may be provided with a lower response time.

Another embodiment provides a hysteresis function to the foregoing methods so that the provisioning manager does not migrate virtual machines based on minor or temporary variations in the response time to a virtual machine. One non-limiting example of such a hysteresis function enforces a time delay after migration of a virtual machine from the first compute node to the second compute node before allowing any subsequent migration of a virtual machine. In networks having more than two compute nodes, a time delay may be enforced after any particular migration. Optionally, a time delay may be enforced selectively to prevent only a specific migration of a virtual machine. Non-limiting examples of such a selective time delay includes delaying a subsequent migration to the same target compute node, or delaying migration to a compute node from which a virtual machine was just migrated. Still further, a hysteresis function may be implemented by the network switch averaging the response time statistics and storing the average in the management information base. In this embodiment, response times are averaged over time to ensure that migration among compute nodes does not occur based on a single instance of a compute node providing a low response time. Otherwise, multiple VM migrations may become uncontrollable.

Although the above methods of the present invention are directed primarily at migrating a virtual machine that is experiencing response times greater than a response time setpoint, the invention might also be implemented to migrate virtual machines among a plurality of compute nodes in the network in order to improve the balance of network response times among the Ethernet links and/or virtual machines. Proactively balancing the response time experienced by virtual machines using the various Ethernet links may not immediately provide a significant improvement in the operation of any of the virtual machines, but may prevent a future degradation of network response times should one or more of the virtual machines subsequently increase their utilization of network resources.

In yet another embodiment, first and second virtual machines may be swapped between first and second compute nodes so that the required response times of the virtual machines will more closely match the users' requirements associated with the first and second compute nodes.

In a still further embodiment, the method comprises determining, prior to migrating the particular virtual machine, that the response time being provided on the second Ethernet link is lower than or equal to the response time required by the particular virtual machine. According to this embodiment, it is not enough that the response time on the second Ethernet link is simply lower that what the particular virtual machine is currently experiencing. Rather, this embodiment determines that the response time on the second Ethernet link is actually low enough to meet the performance requirements of the particular virtual machine. Using a similar alternative metric, the method may comprise determining, prior to migrating the particular virtual machine, that each of the virtual machines on the target compute node are experiencing a lower response time than the response time of the particular virtual machine on the particular compute node.

A separate embodiment of the present invention provides a method, and a computer program product for performing the method, comprising routing traffic within an Ethernet network through a network switch according to IP addresses identified within Ethernet frames, wherein the Ethernet network includes a plurality of compute nodes, and each compute node is coupled to the network switch via a separate Ethernet link. The method also comprises determining a response time for each of a plurality of virtual machines running on the plurality of compute nodes, wherein the response time for a particular one of the virtual machines is calculated as the difference between a time stamp in a TCP/IP Request message and a time stamp in a TCP/IP Response message for an IP address (media access control address) assigned to the particular one of the virtual machines. Still further, the method comprises provisioning an additional virtual machine to a particular one of the compute nodes, wherein the particular compute node is determined as providing the lowest response time to the virtual machines running on the particular compute node. As with the previous embodiments, the method may optionally further comprise determining, prior to migrating the particular virtual machine, determining that the response time being provided on the second Ethernet link is lower than or equal to the response time required by the particular virtual machine. Other aspects of the invention described above with respect to migrating virtual machines may also be applied to methods of provisioning virtual machines.

Figure 2:
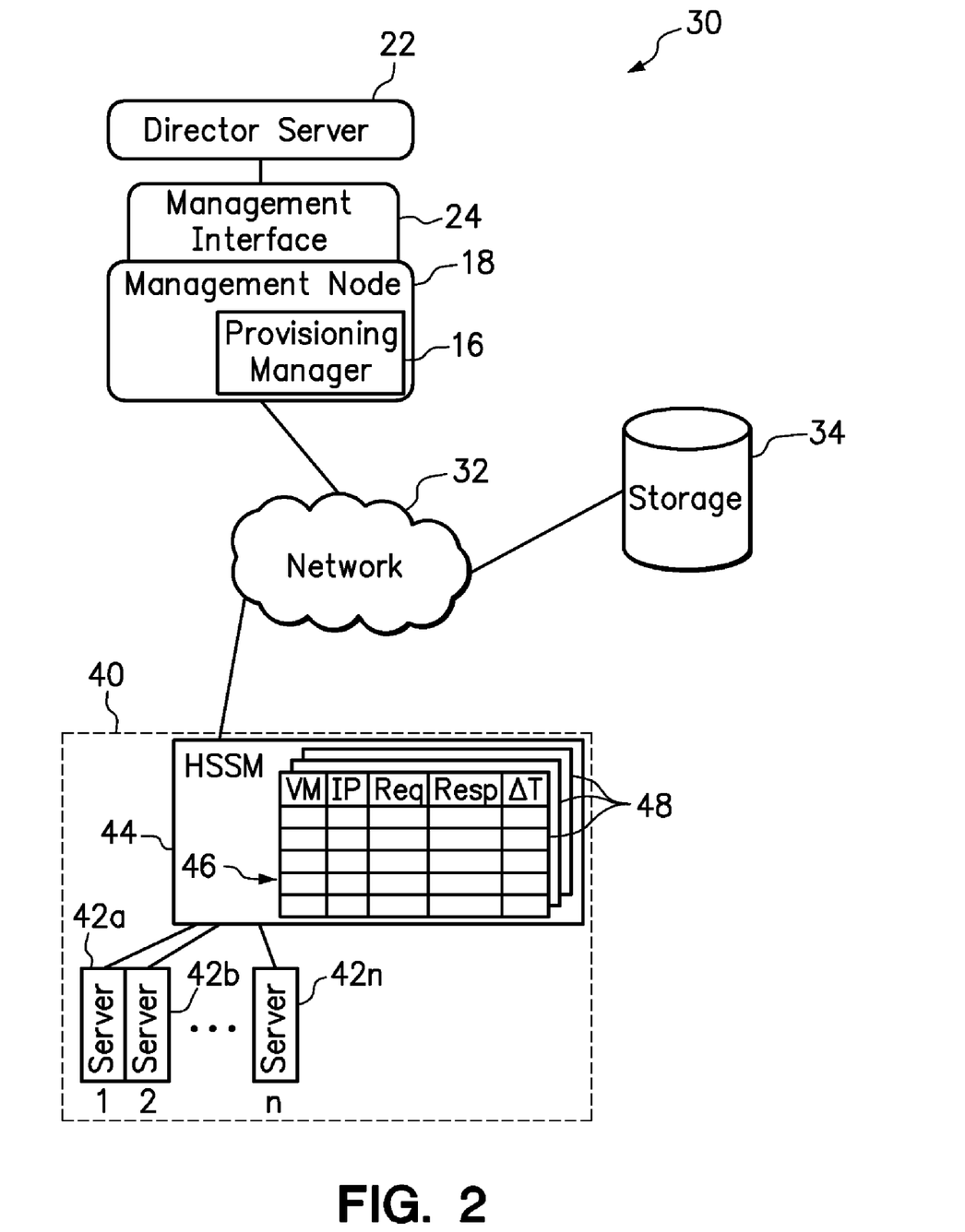
FIG. 2 is a schematic diagram of a plurality of compute nodes coupled to a network switch providing access to a network.

FIG. 2 is a schematic diagram of a system 30 including a plurality of compute nodes, shown as servers 42a-42n, coupled to a network switch 44 providing access to a network 32 and storage 34. The servers 42a-42n and the network switch 44 may be conveniently provided in a blade server system 40, such as the BLADECENTER (a trademark of IBM Corporation, Armonk, N.Y.). Each server blade 42 is connected to the high speed switch module (HSSM) 44 which allows access to a network 32, which might include a Data Center Network, a boot node, or a storage area network (SAN). The HSSM 44 routes traffic to the appropriate destination based on the Internet Protocol (IP) address within the Ethernet frame.

The HSSM 44 includes an IEEE-defined and standardized Management Information Base (MIB) 46 which contains network statistics for each Ethernet link and each IP address. In FIG. 2, an example of the network statistics are illustrated only for one Ethernet link, but the MIB 46 would also include similar network statistics for each Ethernet link. Potentially, "n" servers are coupled to "n" Ethernet ports of the switch 44 and the MIB 46 would keep one table 48 for each of the "n" Ethernet links. The MIB 46 is typically updated at least once each second so the traffic statistics are reliable in the short term. As the traffic traverses the HSSM 44, the HSSM records the IP address and network statistics, for example including the network response times between a TCP/IP Request and a corresponding TCP/IP Response attributable to the IP address. The HSSM 46 can determine how many virtual machines are assigned to a physical server by the number of IP addresses reserved for operating systems running on top of the hypervisor. Although the MIB 46 is illustrated as set of tables 48, it should be recognized that other data structures may also be employed within the scope of the invention.

As the traffic from one of the server blades to the HSSM increases, an increase in the response time to the virtual machines on that server blade can occur. To ensure adequate response times, the provisioning manager 16 may migrate one or more virtual machines from one physical server to one of the other physical servers within the blade server system 40, or another server in the network 32, where it is determined that the Ethernet link is under-utilized and hence has lower response times. The provisioning manager 16 resides on the management node 18, which includes a management interface 24 facilitating communications between the director server 22 and the management node 24.

Figure 3A:
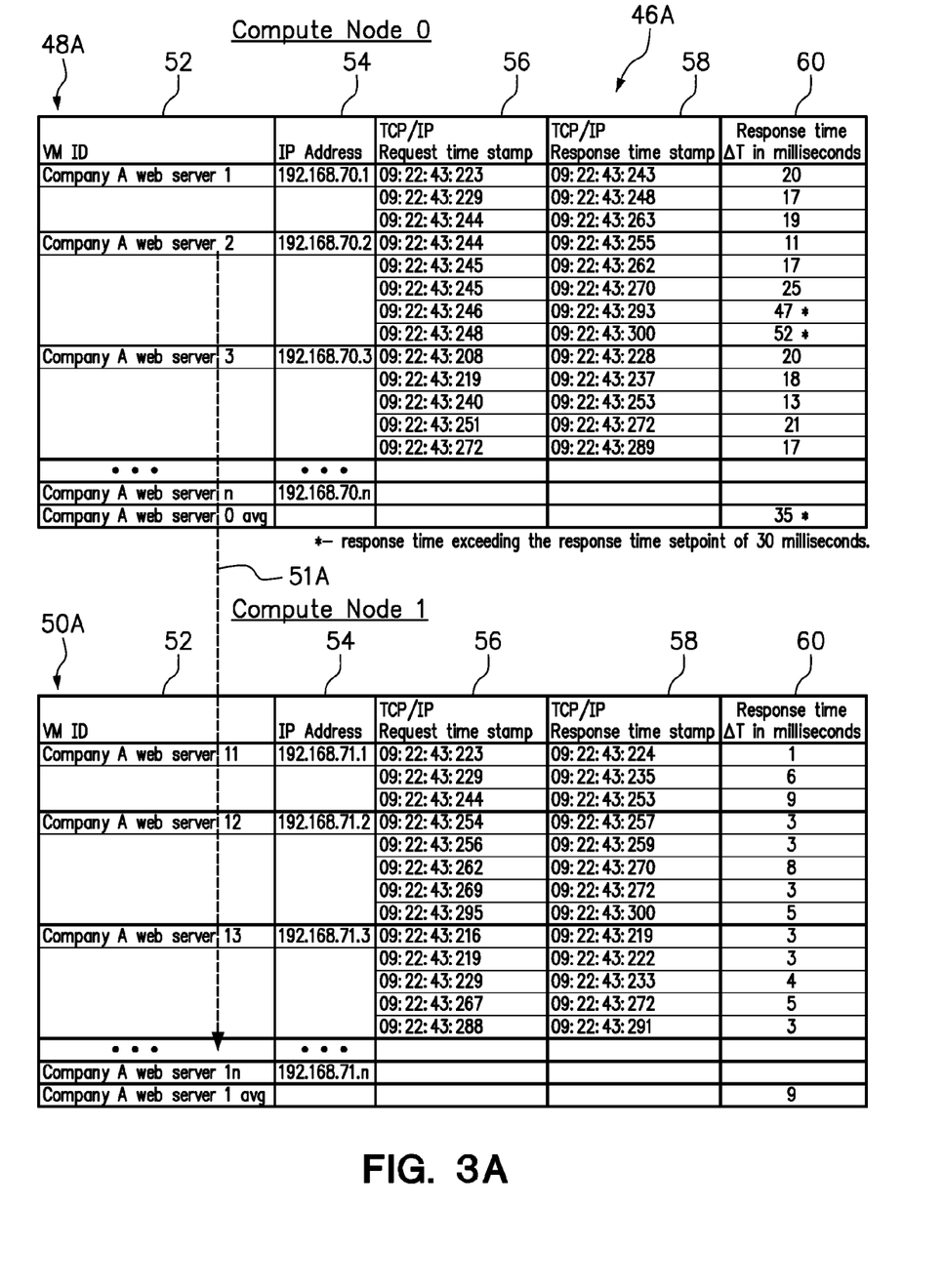
FIGS. 3A and 3B are diagrams illustrating certain contents of a management information database and virtual machines running on two compute nodes.
Figure 3B:
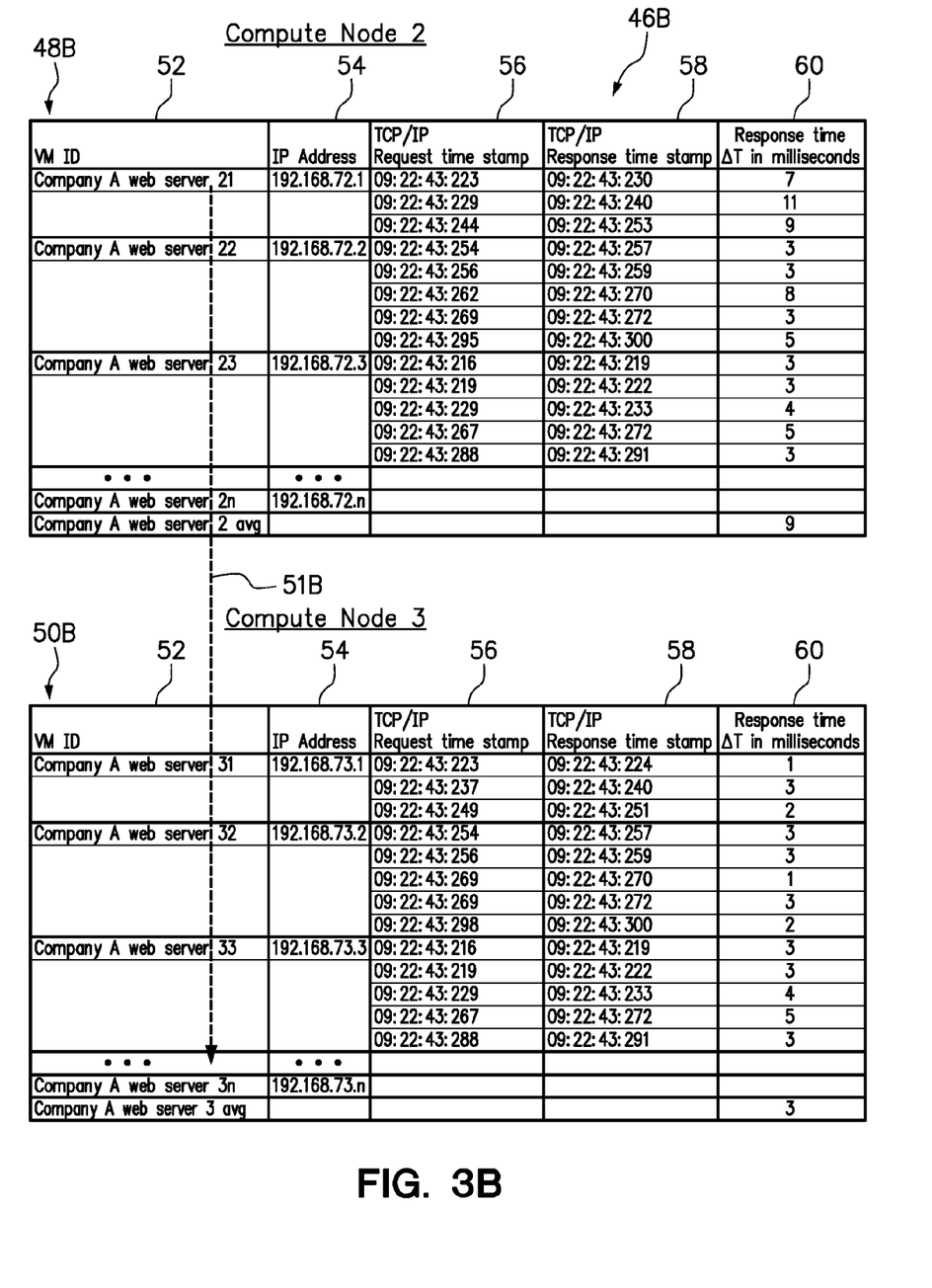

FIGS. 3A and 3B are two separate diagrams, each diagram illustrating certain contents of a hypothetical management information database 46, including a first table 48 for the virtual machines running on a first compute node and a second table 50 for the virtual machines running on a second computer node. As each virtual machine is provisioned or migrated, the virtual machine identification (column 52), such as its media access control (MAC) address, is written into the table along with the IP address (column 54) that is assigned to the virtual machine. As network traffic traversed the HSSM, network statistics are recorded for each IP address, for example including a time stamp in a TCP/IP Request message (column 56) associated with the IP address, and a time stamp in a corresponding TCP/IP Response message (column 58) for the same IP address. Accordingly, the HSSM or the provisioning manager is able to calculate one or more response times experienced by each of the virtual machines (column 60).

FIG. 3A is a diagram illustrating a hypothetical management information database 46A for a customer with virtual machines in two compute nodes. Compute Node 0 (shown at 48A) depicts the condition where the customer response time is too long. In this example, a lower caution threshold of 20 msec is noted and sent as a message to the provisioning manager. The provisioning manager can then more closely monitor the response times in this compute node. In the example, the virtual machine with a VM ID of "Company A Web Server 2" has exceeded the response time threshold. (In this example, the threshold is 30 msec). The provisioning manager examines other nodes and finds that Compute Node 1 (shown at 50A) has an acceptable average response time of 9 msec. The provisioning manager them moves "Company A Web Server 2" to Compute Node 1 (see arrow 51A). Both Compute Node 0 and Compute Node 1 then re-examine the response times to ensure that both nodes have an acceptable response time.

FIG. 3B is a table illustrating a similar hypothetical management information database 46B for two other compute nodes, both having an acceptable response time. However, Compute Node 3 (shown at 50B) is vastly under-utilized, as shown by an average response time of 3 msec. (Note that choosing the best and worst case response times is a function of the application executing on the virtual machine within the compute node. The customer can use default values or can set them based on the customer requirements.) In this example, the provisioning server examines the response times of virtual machines in Compute Node 2 (shown at 48B). Computer Node 2 "Company A Web Server 21" has the worst response time of all virtual machines on these two compute nodes, but those response times are still acceptable to the customer. In order to improve overall response times, the provisioning manager moves "Company A Web Server 21" to Compute Node 3 (see arrow 51B). The provisioning manager can then re-examine the overall response times for both compute nodes and move additional virtual machines, if necessary.

Although the foregoing methods have been described in terms of a first compute node and a second compute node, it should be recognized that the methods may also be performed in a network including more than two compute nodes, where each compute node has its own Ethernet link to a network switch. Furthermore, the network may include compute nodes coupled to more than one network switch where the provisioning manager is able to obtain access to the management information database from each of the network switches. Still further, the method may include multiple provisioning managers or objects that are in communication to cooperatively provision or migrate the virtual machines that they manage.

Figure 4:
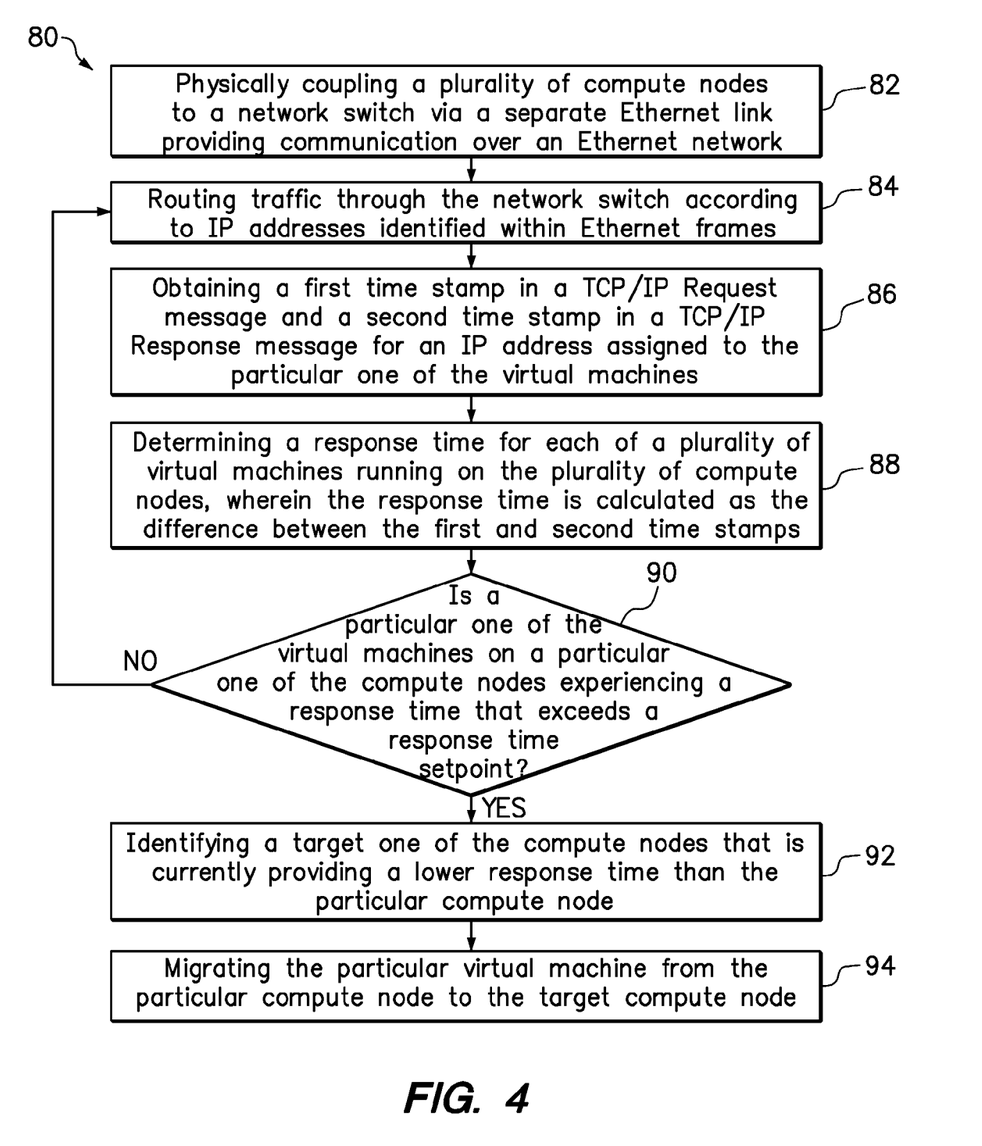
FIG. 4 is a flowchart of a method for migrating a virtual machine from one compute node to another compute node.

FIG. 4 is a flowchart of a method for migrating a virtual machine from one compute node to another compute node. The method 80 is performed with a plurality of compute nodes that are physically coupled to a network switch via a separate Ethernet link providing communication over an Ethernet network, in accordance with step 82. In step 84, traffic is routed through the network switch according to IP addresses identified within Ethernet frames. A first time stamp in a TCP/IP Request message and a second time stamp in a TCP/IP Response message are obtained for an IP address assigned to the particular one of the virtual machines, in step 86. Next, step 88 includes determining a response time for each of a plurality of virtual machines running on the plurality of compute nodes, wherein the response time is calculated as the difference between the first and second time stamps.

Step 90 determines whether there is a particular one of the virtual machines on a particular one of the compute nodes experiencing a response time that exceeds a response time setpoint. If not, then the method returns to step 84. However, if a particular virtual machine is experiencing a response time that exceed the setpoint, then in step 92 the method identifies a target one of the compute nodes that is currently providing a lower response time than the particular compute node. Then, the particular virtual machine is migrated from the particular compute node to the target compute node in step 94.

Figure 5:
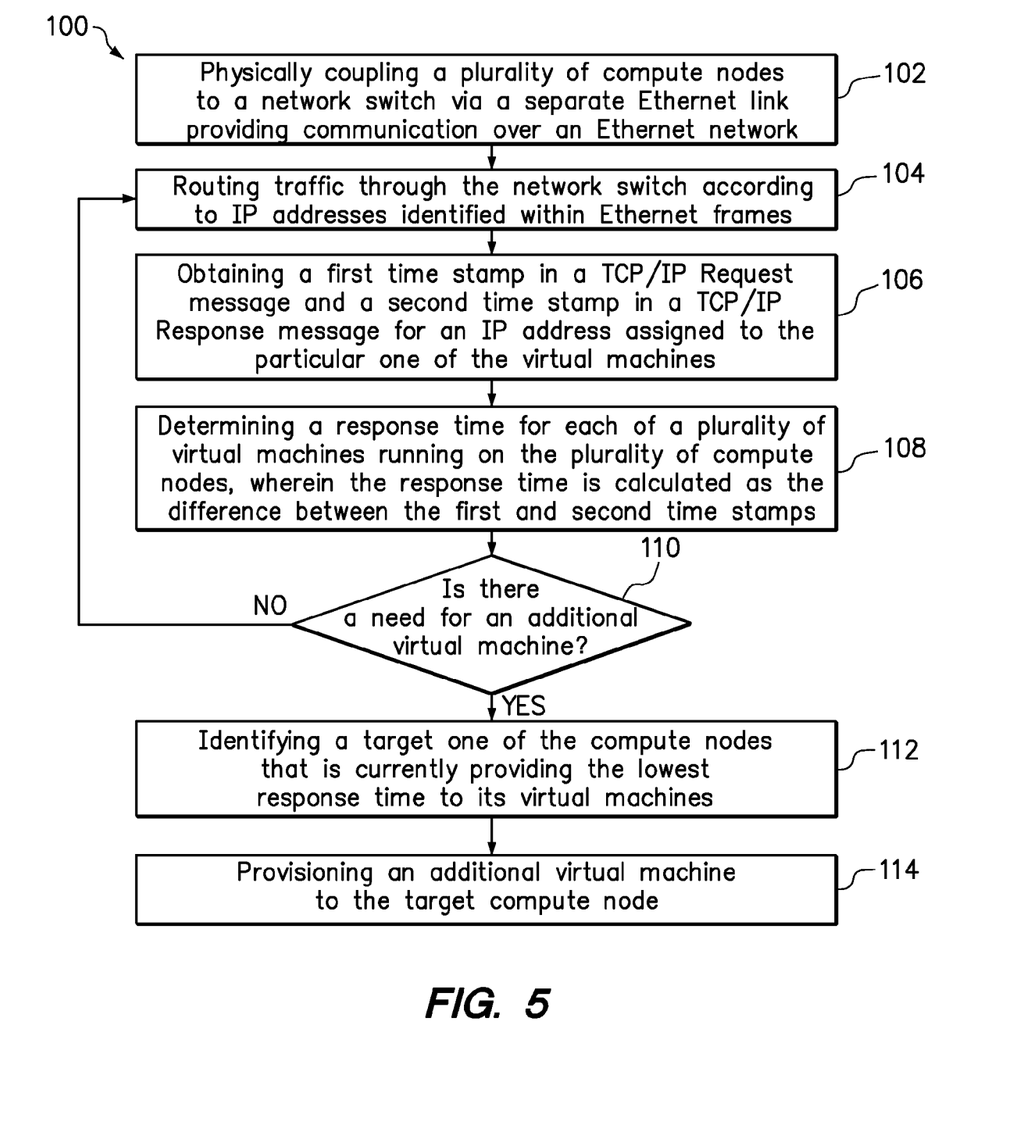
FIG. 5 is a flowchart of a method for provisioning a virtual machine to a compute node.

FIG. 5 is a flowchart of a method 100 for provisioning a virtual machine to a compute node. The first four steps 102, 104, 106, 108 of method 100 are the same as the first four steps 82, 84, 86, 88 of method 80. Specifically, method 100 is performed with a plurality of compute nodes that are physically coupled to a network switch via a separate Ethernet link providing communication over an Ethernet network, in accordance with step 102. In step 104, traffic is routed through the network switch according to IP addresses identified within Ethernet frames. A first time stamp in a TCP/IP Request message and a second time stamp in a TCP/IP Response message are obtained for an IP address assigned to the particular one of the virtual machines, in step 106. Next, step 108 includes determining a response time for each of a plurality of virtual machines running on the plurality of compute nodes, wherein the response time is calculated as the difference between the first and second time stamps.

Step 110 determines whether there is a need for an additional virtual machine. If not, then the method returns to step 104. (This may be the case when a web server is heavily utilized.) However, if an additional virtual machine is needed, then step 112 identifies a target one of the compute nodes that is currently providing the lowest response time to its virtual machines. An additional virtual machine may then be provisioned to the target compute node, in step 114.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   routing traffic within an Ethernet network through a network switch according to IP addresses identified within Ethernet frames, wherein the Ethernet network includes a plurality of compute nodes, and each compute node is coupled to the network switch via a separate Ethernet link;
   determining a response time for each of a plurality of virtual machines running on the plurality of compute nodes, wherein the response time for a particular one of the virtual machines is calculated as the difference between a time stamp in a TCP/IP Request message and a time stamp in a TCP/IP Response message for an IP address assigned to the particular one of the virtual machines; and
   in response to a particular one of the virtual machines on a particular one of the compute nodes having a response time that exceeds a response time setpoint, migrating the particular virtual machine from the particular compute node to a target one of the compute nodes that is determined to be currently providing a lower response time than the specified compute node.

2. The method of claim 1, further comprising:
   the network switch maintaining a management information database identifying the IP addresses associated with each of the Ethernet links.

3. The method of claim 2, further comprising:
   reading the management information database of the network switch to determine the response time provided by each compute node; and
   selecting the target compute node as one of the compute nodes currently providing a lower response time than the specified compute node.

4. The method of claim 1, wherein the response time is determined by a network switch.

5. The method of claim 1, further comprising:
   identifying the TCP/IP Response message as having the next sequence number following a sequence number in the TCP/IP Request message for the IP address.

6. The method of claim 1, further comprising:
   enforcing a time delay after migrating the specified virtual machine before any further virtual machine may be migrated.

7. The method of claim 1, further comprising:
   prior to migrating the particular virtual machine, determining that the response time being provided on the second Ethernet link is lower than or equal to the response time required by the particular virtual machine.

8. The method of claim 1, further comprising:
   prior to migrating the particular virtual machine, determining that each of the virtual machines on the target compute node are experiencing a lower response time than the response time of the particular virtual machine on the particular compute node.

9. The method of claim 1, wherein the IP address is a media access control address.

10. A computer program product including computer usable program code embodied on a non-transitory computer usable storage medium, the computer program product comprising:
    computer usable program code for routing traffic within an Ethernet network through a network switch according to IP addresses identified within Ethernet frames, wherein the Ethernet network includes a plurality of compute nodes, and each compute node is coupled to the network switch via a separate Ethernet link;

computer usable program code for determining a response time for each of a plurality of virtual machines running on the plurality of compute nodes, wherein the response time for a particular one of the virtual machines is calculated as the difference between a time stamp in a TCP/IP Request message and a time stamp in a TCP/IP Response message for an IP address assigned to the particular one of the virtual machines; and computer usable program code for migrating, in response to a particular one of the virtual machines on a particular one of the compute nodes having a response time that exceeds a response time setpoint, the particular virtual machine from the particular compute node to a target one of the compute nodes that is determined to be currently providing a lower response time than the specified compute node.

11. The computer program product of claim 10, further comprising:

computer usable program code for maintaining a management information database identifying the IP addresses associated with each of the Ethernet links.

12. The computer program product of claim 11, further comprising:

computer usable program code for reading the management information database of the network switch to determine the response time provided by each compute node; and computer usable program code for selecting the target compute node as one of the compute nodes currently providing a lower response time than the specified compute node.

13. The computer program product of claim 10, further comprising:

computer usable program code for identifying the TCP/IP Response message as having the next sequence number following a sequence number in the TCP/IP Request message for the IP address.

14. The computer program product of claim 10, further comprising:

computer usable program code for enforcing a time delay after migrating the specified virtual machine before any further virtual machine may be migrated.

15. The computer program product of claim 10, further comprising:

computer usable program code for determining, prior to migrating the particular virtual machine, that the response time being provided on the second Ethernet link is lower than or equal to the response time required by the particular virtual machine.

16. The computer program product of claim 10, further comprising:

computer usable program code for determining, prior to migrating the particular virtual machine, that each of the virtual machines on the target compute node are experiencing a lower response time than the response time of the particular virtual machine on the particular compute node.

17. The method of claim 10, wherein the IP address is a media access control address.

18. A method, comprising:

routing traffic within an Ethernet network through a network switch according to IP addresses identified within Ethernet frames, wherein the Ethernet network includes a plurality of compute nodes, and each compute node is coupled to the network switch via a separate Ethernet link;

determining a response time for each of a plurality of virtual machines running on the plurality of compute nodes, wherein the response time for a particular one of the virtual machines is calculated as the difference between a time stamp in a TCP/IP Request message and a time stamp in a TCP/IP Response message for an IP address assigned to the particular one of the virtual machines; and provisioning an additional virtual machine to a particular one of the compute nodes, wherein the particular compute node is determined as providing the lowest response time to the virtual machines running on the particular compute node.

19. The method of claim 18, further comprising:

prior to migrating the particular virtual machine, determining that the response time being provided on the second Ethernet link is lower than or equal to the response time required by the particular virtual machine.

20. The method of claim 18, wherein the IP address is a media access control address.

21. A computer program product including computer usable program code embodied on a non-transitory computer usable storage medium, the computer program product comprising:

computer usable program code for routing traffic within an Ethernet network through a network switch according to IP addresses identified within Ethernet frames, wherein the Ethernet network includes a plurality of compute nodes, and each compute node is coupled to the network switch via a separate Ethernet link;

computer usable program code for determining a response time for each of a plurality of virtual machines running on the plurality of compute nodes, wherein the response time for a particular one of the virtual machines is calculated as the difference between a time stamp in a TCP/IP Request message and a time stamp in a TCP/IP Response message for an IP address assigned to the particular one of the virtual machines; and computer usable program code for provisioning an additional virtual machine to a particular one of the compute nodes, wherein the particular compute node is determined as providing the lowest response time to the virtual machines running on the particular compute node.

22. The computer program product of claim 21, further comprising:

computer usable program code for determining, prior to migrating the particular virtual machine, that the response time being provided on the second Ethernet link is lower than or equal to the response time required by the particular virtual machine.

23. The method of claim 21, wherein the IP address is a media access control address.

* * * * *